US010551489B2

(12) United States Patent
Richard

(10) Patent No.: US 10,551,489 B2
(45) Date of Patent: Feb. 4, 2020

(54) HYBRID MAGNETIC-RADAR DETECTOR FOR SPACE MANAGEMENT

(71) Applicant: PARK24, Paris (FR)

(72) Inventor: Xavier Richard, Paris (FR)

(73) Assignee: CIRCET, Sollies-Pont (FR)

( * ) Notice: Subject to any disclaimer, the term of this patent is extended or adjusted under 35 U.S.C. 154(b) by 331 days.

(21) Appl. No.: 15/116,046

(22) PCT Filed: Feb. 5, 2015

(86) PCT No.: PCT/EP2015/052451
§ 371 (c)(1),
(2) Date: Aug. 2, 2016

(87) PCT Pub. No.: WO2015/118084
PCT Pub. Date: Aug. 13, 2015

(65) Prior Publication Data
US 2017/0168155 A1 Jun. 15, 2017

(30) Foreign Application Priority Data
Feb. 10, 2014 (EP) .................................... 14154427

(51) Int. Cl.
*G01S 13/86* (2006.01)
*G01S 13/04* (2006.01)
(Continued)

(52) U.S. Cl.
CPC .............. *G01S 13/86* (2013.01); *G01S 13/04* (2013.01); *G01S 13/325* (2013.01); *G01S 13/88* (2013.01);
(Continued)

(58) Field of Classification Search
CPC ............................... G01S 13/86; G01S 7/2922
See application file for complete search history.

(56) References Cited

U.S. PATENT DOCUMENTS 3,882,493 A 5/1975 Bolger
3,882,494 A 5/1975 Bolger
(Continued)

FOREIGN PATENT DOCUMENTS

EP 0866434 A1 9/1998
GB 2319873 A 6/1998
KR 20120126739 A 11/2012

OTHER PUBLICATIONS

"ISM band—Wikipedia, the free encyclopedia", Dec. 5, 2013, XP055124090, Retrieved from the Internet on Jul. 26, 2016: http://en.wikipedia.org/wiki/ISM_band.
(Continued)

*Primary Examiner* — Marcus E Windrich
(74) *Attorney, Agent, or Firm* — BCF LLP

(57) ABSTRACT

Methods and systems for detection of an occupancy status of a space monitored by a system (100) are described herein. The method comprises detecting a magnetic field value at the space by a magnetic field sensor (210) of a sensing device (104). The detected magnetic field value with a reference magnetic field value, to determine a magnetic occupancy status (MOS) of the space. The MOS is indicative of the change in the occupancy status of the space. The change in the occupancy status is indicative of one of a change from empty to occupied occupancy status, and a change from occupied to empty occupancy status. Further, when the MOS indicates the change in the occupancy status of the space, a radar sensor (212) of the sensing device (104) is activated to determine a radar occupancy status (ROS) by generating at least one radar reading from the radar sensor (212). The ROS is indicative of the change in the occupancy status of the space. Thereafter, the change in the occupancy status of the space is established when the ROS indicating the change in the occupancy status of the space is in agreement with the MOS. Further, the established change of
(Continued)

the occupancy status in the space is communicated to a central unit (102) of the system (100).

12 Claims, 5 Drawing Sheets

(51) Int. Cl.
*G08G 1/042* (2006.01)
*G08G 1/14* (2006.01)
*G01S 13/88* (2006.01)
*G01S 13/32* (2006.01)
*G07B 15/02* (2011.01)
*H04L 29/08* (2006.01)

(52) U.S. Cl.
CPC ............ *G07B 15/02* (2013.01); *G08G 1/042* (2013.01); *G08G 1/14* (2013.01); *H04L 67/141* (2013.01); *G06Q 2240/00* (2013.01)

(56) References Cited

U.S. PATENT DOCUMENTS

| | | | |
|---|---|---|---|
| 4,688,244 A | 8/1987 | Hannon et al. | |
| 5,175,553 A | 12/1992 | Le Garrec | |
| 5,512,891 A | 4/1996 | Kang | |
| 5,856,788 A * | 1/1999 | Walter | G06K 7/0008 235/375 |
| 5,877,706 A | 3/1999 | Summersgill | |
| 6,914,552 B1 * | 7/2005 | McEwan | G01S 13/0209 342/193 |
| 7,345,595 B1 | 3/2008 | Heckman | |
| 7,884,727 B2 * | 2/2011 | Tran | A61B 5/0006 340/573.1 |
| 8,723,717 B2 * | 5/2014 | Saito | G01S 7/41 342/176 |
| 8,922,371 B2 * | 12/2014 | Mohamadi | G01S 7/003 340/552 |
| 2006/0136131 A1 * | 6/2006 | Dugan | G01V 3/081 701/300 |
| 2007/0152871 A1 | 7/2007 | Puglia | |
| 2011/0221624 A1 * | 9/2011 | Kavaler | G01S 7/003 342/22 |
| 2011/0241942 A1 * | 10/2011 | Hill | G01S 5/0205 342/451 |
| 2012/0062393 A1 * | 3/2012 | Desiderio | G01S 7/003 340/932.2 |
| 2012/0285790 A1 * | 11/2012 | Jones | G07B 15/02 194/217 |
| 2014/0218527 A1 * | 8/2014 | Subramanya | G08G 1/143 348/148 |
| 2014/0300504 A1 * | 10/2014 | Shaffer | G01S 13/86 342/27 |

OTHER PUBLICATIONS

International Search Report and Written Opinion with regard to PCT/EP2015/052451 dated Mar. 27, 2015.
English Abstract of KR20120126739 retrieved on Espacenet on Jul. 26, 2016.
English Abstract of EP0866434 retrieved on Espacenet on Jul. 26, 2016.
Extented Search Report with regard to EP 14154427.0 dated Jun. 27, 2014.

* cited by examiner

HYBRID MAGNETIC-RADAR DETECTOR FOR SPACE MANAGEMENT

TECHNICAL FIELD

The present subject matter is related, in general, to a space management system and, in particular, to methods and systems for detecting a change in occupancy status of a space.

BACKGROUND

Conventional space management systems commonly employ space-occupancy status detectors to detect a change in an occupancy status of a space by an object having metallic parts, such as a vehicle. For ascertaining the change in the occupancy status of the space, the space-occupancy status detectors may utilize a network of sensors, each installed within one of the spaces, to ascertain the change in the occupancy status of each of the spaces. The ascertained change in the occupancy status is then communicated to a central unit to compute an exact number of available spaces. However, such ascertaining process is a time consuming process, as each cycle of the ascertaining process may consume, say, more than 5 seconds (please confirm). Also, the conventional space management systems consume high amount energy for ascertaining the change in status, as the conventional space management systems may generally use high energy consuming sensors, such as infrared telemeters, radar sensors, electromechanical detectors and the like. Furthermore, the accuracy of the conventional space management is around 90%, that is not enough, in particular when the space management is linked to a billing system, for example, for a parking system.

SUMMARY

This summary is provided to introduce concepts related to methods and systems for detecting a change in occupancy status of a space, as described in the independent claims. Further embodiments of the subject matter are defined by the dependent claims. The following presents a summary of the present subject matter in order to provide a basic understanding of some aspects of the claimed subject matter.

In one implementation, the present subject matter relates to a method for detection a change in an occupancy status of a space monitored by a system. In an example, a magnetic field sensor of a sensing device detects a magnetic field value at the space, and compares the detected magnetic field value with a reference magnetic field value. Based on the comparison, a magnetic occupancy status (MOS) of the space is determined. In an example, the MOS is indicative of the change in the occupancy status of the space. Further, when the MOS indicates the change in the occupancy status of the space, a radar sensor of the sensing device is activated to determine a radar occupancy status (ROS), where the ROS is indicative of the change in the occupancy status of the space. Thereafter, the change in the occupancy status of the space is established, when the ROS indicating the change in the occupancy status of the space is in agreement with the MOS. The established change in the occupancy status of the space is then communicated to a central unit of the system.

In another implementation, a system for detection of a change in an occupancy status of a space is described. In an example, the system includes a central unit for monitoring the change in the occupancy status of the space, and a sensing device communicatively coupled to the central unit. The sensing device includes a processor, a magnetic detection module, and a radar detection module. The magnetic detection module compares a detected magnetic field value at the space by a magnetic field sensor with a reference magnetic field value of the space, and determines a magnetic occupancy status (MOS) of the space based on the comparison. In an example, the MOS is indicative of the change in the occupancy status of the space. Further, the radar detection module activates a radar sensor when the MOS indicates the change in the occupancy status of the space. Thereafter, the radar sensor generates at least one radar reading, based on which a radar occupancy status (ROS). The ROS is indicative of change in the occupancy status of the space. The radar detection module then establishes the change in the occupancy status of the space when the MOS is in agreement with the ROS, and communicates the change in the occupancy status of the space to the central unit.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
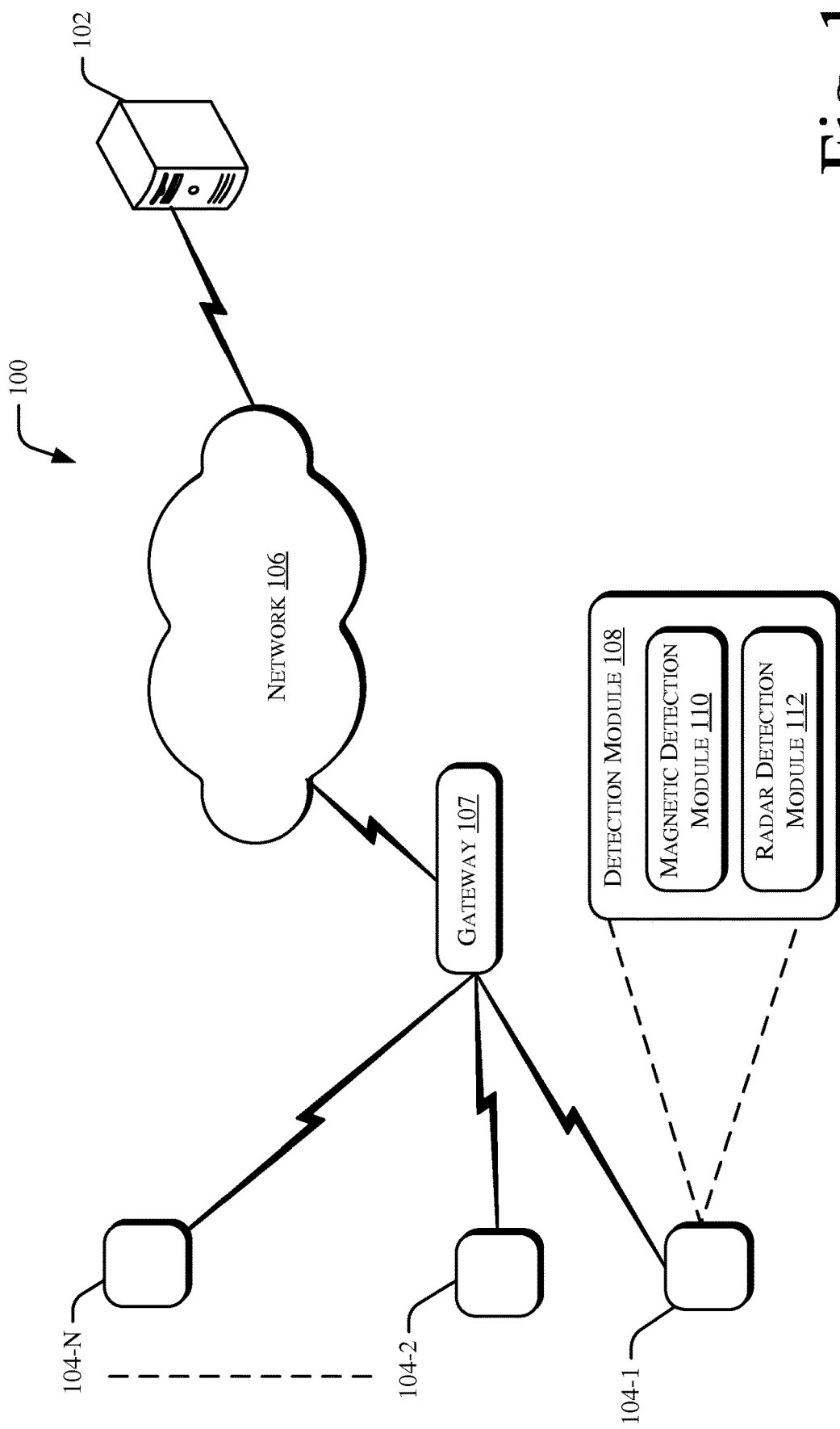
FIG. 1 illustrates an exemplary system for detecting a change in an occupancy status of a space, according to an embodiment of the present subject matter.

The present subject matter relates to methods and systems for detection a change in occupancy status of a space in a space lot.

Nowadays, a space management system includes a space lot having a number of spaces, for example, for parking of vehicles. The space management system further includes a central unit positioned within or outside the space lot, and includes, at each of the number of the spaces, at least one sensor device for determining the presence or absence of an object, for example, vehicle, in a respective space. The sensor device commonly includes at least one sensor in the form of a magnetic field sensor. The magnetic field sensor is preferred over the other sensors because it is less sensitive to most kinds of fouling and consumes only a slight amount of energy. Further, the magnetic field sensor, in operation, provides measuring values to the central unit, where the measuring values are representative of the presence or absence of an object in a respective space.

As can be appreciated by a person skilled in the art, as a measurement principle, the magnetic field sensor generally measures strength of earth's magnetic field in one or more dimensions. Thereafter, the magnetic field sensor, for example, three-dimensional magnetic field sensor, measures the disturbance in the earth's magnetic field, caused by a moving or stationary object, to determine the presence or absence of the vehicle. However, an issue with the use of the magnetic field sensor is that the earths magnetic field constantly changes or drifts as a result of many factors. As a result, the magnetic field sensor is more often subjected to false readings which may result in erroneous determination of the presence or absence of the object. Thus, the magnetic field sensor may not detect the change in the occupancy status of the object having metallic parts, for example, metallic vehicles. Another issue is that the magnetic field sensor is generally subjected to drift as a result of a change in temperature or due to random and discontinuous environmental disturbances, such as subway, bus, high voltage cables, water mains, and the like. As a result, the magnetic field sensor that has detected an object in the morning, may not detect when that object has left or the magnetic field sensor gives erratic readings.

Further, to confirm the measuring values of the magnetic field sensor about the occupancy of a space, other type of sensors besides the magnetic field sensor are generally employed along with the magnetic field sensor. However, the other types of sensors, such as infrared telemeters, radar sensors, electromechanical detectors, and the like, are relatively costly and consume high amount of energy. Hence, the other types of sensors are less suited for space management applications, and are sensitive to fouling, snowing, and icing.

Thus, the available space management systems or sensors may not confirm the change in the occupancy status of the space with high accuracy.

According to an exemplary embodiment of the present subject matter, the above mentioned issues may at least partly be obviated by activating a high energy consuming sensor only when, with a magnetic field sensor, a change in an occupancy status of a space in space lot has been detected. In addition, the magnetic field sensor could be switched-on, for instance, once per unit time, i.e., once a second to reduce the consumption of energy.

Further, in the description hereinafter of the present subject matter and without any limitation, a term 'space' may be understood to refer a place, a garage, a parking place, a parking spot, a parking bay, a parking space, an harbor, a rack, or a railway station. Similarly, the term 'space lot' may be understood to refer to an array of a number of spaces, such as a hub, a parking lot, a parking arrangement, a parking zone, a parking lane, a railway, a rack and the like. Further, the term 'object' may be understood to refer any type of object including, for example, construction equipment, supplies, dumpsters, snow plowed into a heap, delivery crates, vehicles, bottles of gas, boats, containers, wagons, and the like, that can be positioned in the space.

Yet further, the description hereinafter of the present subject matter includes various specific details to assist in that understanding but these are to be regarded as merely exemplary. Accordingly, those of ordinary skill in the art will recognize that various changes and modifications of the embodiments described herein can be made without departing from the scope and spirit of the present subject matter. In addition, descriptions of well-known functions and constructions may be omitted for clarity and conciseness.

In accordance with an exemplary embodiment of the present subject matter, methods and systems for detection of an occupancy status of a space are described herein. The methods of the present subject matter are carried out by a sensing device employing a hybrid measurement principle based on a magnetic field sensor and a radar sensor. In an example, the sensing device is placed at a ground floor of the space, and is in communicative connection with a central unit of the system described herein for communicating a change in the occupancy status of the space.

In an example, the magnetic field sensor of the sensing device initiates the methods of the present subject matter by detecting a magnetic field value at a space and then transmitting the detected magnetic field value to a processor of the sensing device. The processor then compares the detected magnetic field value with a reference magnetic value, i.e., earth's magnetic field value, obtained in the absence of a vehicle in the space. Based on the comparison, the processor determines a magnetic occupancy status (MOS). In an example, the MOS is indicative of the change in the occupancy status of the object in the space. In this example, the occupancy status may change from 'empty' to 'occupied' occupancy status, and vice versa.

Further, as known from the state of the art, the measurement performed by the magnetic field sensor about the occupancy status of the space is commonly required to be confirmed using other type of sensor. For this purpose, in accordance with the present subject matter, when the MOS indicates the change in the occupancy status of the space, the radar sensor of the sensing device is activated to confirm the change in the occupancy status of the space. That is, whenever the magnetic field sensor detects the change in the occupancy status of the space from 'empty' to 'occupied', and vice versa, the radar sensor is activated to confirm the said change in the occupancy status of the space.

In an example, the radar sensor determines a radar occupancy status (ROS) by generating at least one radar reading. In an example, the ROS is indicative of the change in the occupancy status of the space. In this example, the occupancy status may change from 'empty' to 'occupied' occupancy status, and vice versa.

Once the ROS is determined, the radar sensor establishes the change in the occupancy status of the space, when the ROS indicating the change in the occupancy status of the space is in agreement with the MOS. The established change in the occupancy status of the space is then communicated to the central unit of the system described herein. In an example, the central unit may be positioned within or outside a space lot in which the sensing device is placed at a ground floor of the space.

In an example, when the ROS indicating the change in the occupancy status of the space is in disagreement with the MOS, then the sensing device may not communicate with the central unit.

Thus, in accordance with the mentioned exemplary embodiment, the magnetic sensor keeps detecting the change in the occupancy status of the space at regular intervals, say, 1 Hertz; and when the magnetic field sensor detects the change in the occupancy status of the space, the radar sensor, which is a high energy consuming sensor, is activated to confirm the detection. This results in reduction of the duty cycle of the radar sensor by using a lower power sensor, such as the magnetic field sensor, for primary detection and then uses the radar sensor to verify the detection result. The radar sensor, in this way, is used intermittently to consume very little energy. In an example, the radar sensor may carry out the radar reading at 250 μA/3V.

Further, in accordance with the present subject matter, the radar sensor may operate at a frequency of 2.4 Giga Hertz (GHz) in Industrial Scientific and Medical radio bands (ISM), so that radar emissions are compatible with electromagnetic radiation of almost all countries of the world and, at the same time, the radar sensor may consume less energy as compared to the radar sensor available in the market. By designing the radar sensor with the operating frequency of 2.4 GHz, the radar sensor incorporates space saving components, by means of which size of the radar sensor may reduce and the radar sensor may become inexpensive as compared to the radar sensor available in the market.

Further, in accordance with the present subject matter, the radar sensor transmits a radio signal with a pseudo random code sequence to distinguish its own signal from signals of the other adjacent radar sensors. The usage of the pseudo random code sequence in turn reduces the processing time and the energy consumption, which are generally required for distinguishing a signal from simultaneously active other similar signals. Yet further, by transmitting the radio signal with the pseudo random code sequence, the radio signal is avoided from getting interfered with signals transmitted from other adjacent radar sensors.

Further, the exemplary embodiment of the present subject matter described herein may be implemented to a number of spaces in the space lot, in which each of the number of spaces is provided or equipped with at least one sensing device. In this example, the present subject matter may detect the occupancy status of, but not limited to, 1000 spaces in the space lot, with accuracy greater than 99.9%.

Yet further, it should be noted that the description herein merely illustrates the principles of the present subject matter. It will thus be appreciated that various arrangements may also be employed that, although not explicitly described herein, embody the principles of the present subject matter and are included within its scope. Furthermore, all examples recited herein are principally intended expressly to be only for explanation purposes to aid the reader in understanding the principles of the present subject matter, and are to be construed as being without limitation to such specifically recited examples and conditions. Moreover, all statements herein reciting principles, aspects, and embodiments of the present subject matter, as well as specific examples thereof, are intended to encompass equivalents thereof. The manner in which the methods shall be implemented onto various systems has been explained in detail with respect to the FIGS. 1-5. While aspects of described systems and methods can be implemented in any number of different computing devices and/or configurations, the embodiments are described in the context of the following system(s).

FIG. 1 illustrates, as an example, a system 100 for detection of an occupancy status of a space, in accordance with an exemplary embodiment of the present subject matter. The system 100 includes a central unit 102 communicating with one or more sensing devices 104-1, 104-22 . . . , 104-N, hereinafter collectively referred to as sensing devices 104 and individually as sensing device 104. The central unit 102 communicates with the one or more sensing devices 104 over a network 106.

In an example, the network 106 may be a wireless network, wired network, or a combination thereof. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

In an example, the network 106 may include various network entities, such as router or gateway 107. In said example, the one or more sensing devices 104 are able to connect to the network 106 through the router or the gateway 107.

In an example, data transmitted between each gateway 107 and the central unit 102 are encrypted according to a secured protocol, say HTTPS Java Script Object Notation (JSON). In another example, the data transmitted by each sensing device 104 to its respective gateway 107 are of the wireless type, say at the format DASH7 encrypted according to Advanced Encryption Standard (AES) 128 bits. As a result, the communication between the sensing device 104 and the central unit 102 is robust and is able to go through a building in a long distance and occupies a low bandwidth. The communication is also secure in order to permit the establishment of a secure billing system. In an example, a Virtual Private Network (VPN) server (not shown) is used for descending data from the central unit 102 to the sensing device 104 via the network 106 and the gateway 107.

Further, in an example, the central unit 102 may be a space server, a parking server, data server, database or file. In the said example, the central unit 102 may receive occupancy status data from each of the sensing devices 104 regarding the change in the occupancy status of various spaces of a space lot. Based on the occupancy status data, the central unit 102 may generate space data of available 'empty' spaces in the space lot and transmits the same for display on a display panel provided at an entrance of the space lot. In an example, when a object, say, vehicle, stops at the entrance, the central unit 102 may also display a map of the space lot with an indication of each of the 'empty' spaces and a route from the entrance to the 'empty' spaces.

Yet further, in order to provide the occupancy status data to the central unit 102, the sensing devices 104 may implement a hybrid measurement principle based on a magnetic field sensor and a radar sensor. For example, each of the sensing devices 104 may include a detection module 108, having a magnetic detection module 110 and a radar detection module 112, to detect an occupancy status of a space in a space lot. The magnetic detection module 110 triggers the magnetic field sensor to keep detecting the change in the occupancy status of the space at regular intervals, say, 1 Hertz. And, when the magnetic field sensor detects the change in the occupancy status of the space, the radar detection module 112 is informed by the magnetic detection module 110, to activate the radar sensor for confirming the detection. This results in reduction of the duty cycle of the radar sensor and thereby reduction in the consumption of energy.

Figure 2:
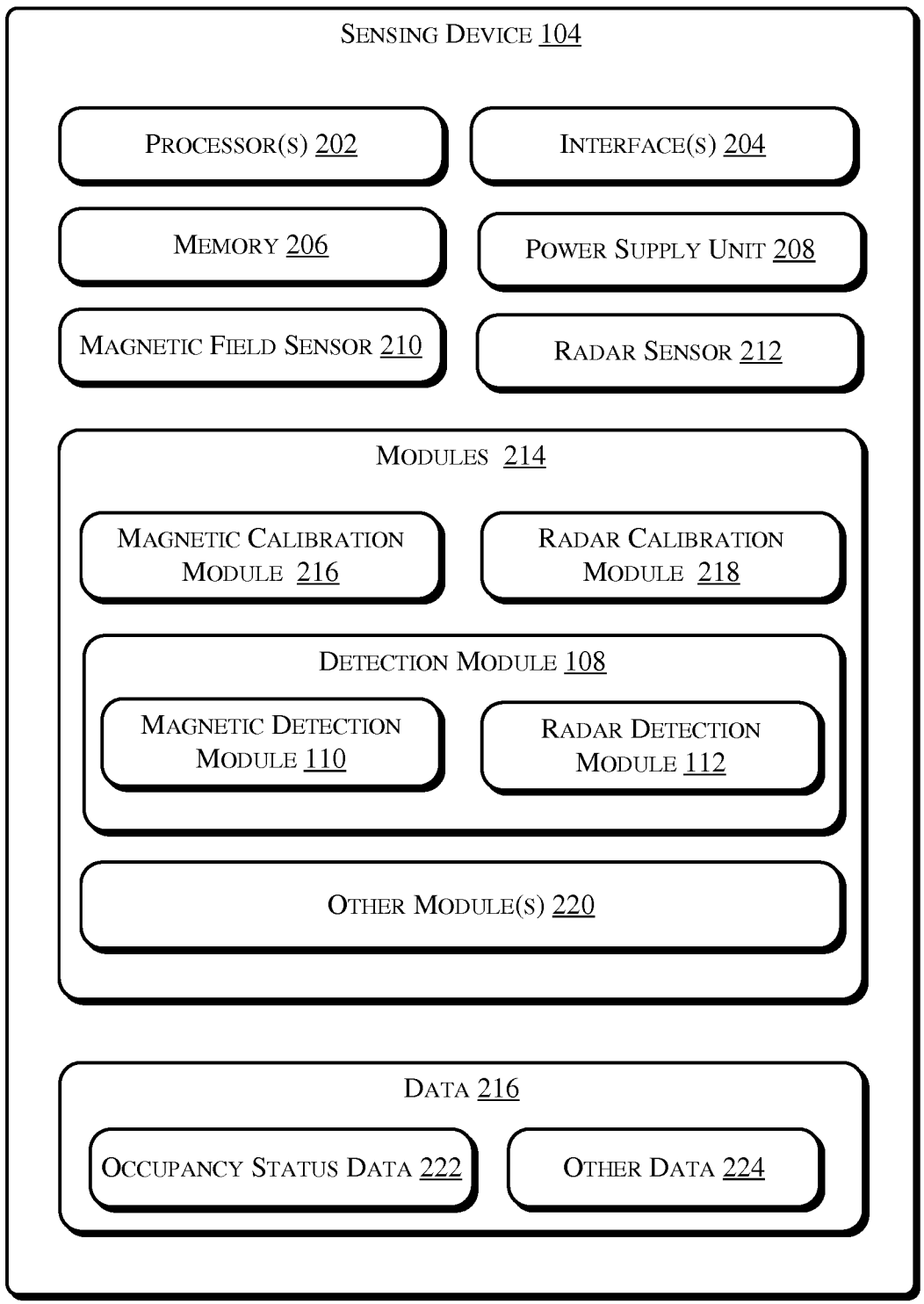
FIG. 2 illustrates a sensing device of the system for detecting the change in the occupancy status of the space, according to an embodiment of the present subject matter.

FIG. 2 illustrates exemplary components of a sensing device 104, in accordance with an embodiment of the present subject matter. In an example, the sensing device 104 may be assembled in a round shape wafer of dimensions (without battery), for example, 7 cm diameter and 1 cm depth. Yet further, in an example, the sensing device 104 is designed with no moving sub-parts, i.e., the various sub-parts of the sensing device 102 are positioned in a fixed manner with respect to each other.

Further, in an example, the sensing device 104, having a magnetic field sensor and a radar sensor, may be placed on a typical space of dimensions 3 m×5 m (width and length). In said example, the sensing device 104 may be disposed on a ground floor of the space at around 1 m×3 m inside the space as seen from the entrance of the space so that, for a symmetrically parked object in the space, the sensing device 104 is positioned eccentric with respect to axes of symmetry of the object while remaining under the object.

In another alternative example, a magnetic field sensor of the sensing device may be disposed on a ground floor of a space while the radar sensor may be positioned laterally or above the space. The radar sensor is positioned in such a way that radar emission from the radar sensor is directed to the space where an object is to be detected using a bi-directional antenna of the radar sensor. In this example, the two sensors, i.e., the magnetic field sensor and the radar sensor, are although disposed at different locations in the space, but they always maintain a positive association with each other.

In yet another alternative example, a single sensing device may be deployed for several adjacent spaces. In such example, the sensing device includes a single magnetic sensor and a plurality of radar sensors directed to each of the adjacent spaces.

Further, in one implementation, the sensing device 104 includes one or more processor(s) 202, I/O interface(s) 204, and a memory 206 coupled to the processor(s) 202. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 is configured to fetch and execute computer-readable instructions stored in the memory 206.

The I/O interface(s) 204 may include a variety of software and hardware interfaces, for example, interfaces for peripheral device(s), such as a keyboard, a mouse, and an external memory. Further, the I/O interfaces 204 may facilitate multiple communications within a wide variety of protocol types including, operating system to application communication, inter process communication, etc.

The memory 206 can include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one implementation, the sensing device 104 may include a power supply 208. In said implementation, the power supply 208 may include battery and a power supply circuit. In an example, the battery has a capacity ranging from about 5000/10000 mAh to 3.6 V. Such capacity allows the sensing device 104 to be functional for a period of about 5 years. In an example, the power supply circuit includes a DC-DC voltage converter in order to lower the voltage supplied to some parts of the power supply circuit while reducing the power consumption. Further, in an example, the power supply circuit may include capacitances between the battery and active elements of the power supply circuit to reduce the instantaneous maximum load of the battery.

In one implementation, the sensing device 104 may include a magnetic field sensor 210 for determining the presence or absence of a metallic object in respective place. In an example, the magnetic field sensor 210 may be a Micro-Electro Mechanical System (MEMS) sensor. In another example, the magnetic field sensor 210 may be a one-dimensional or three-dimensional magnetic field sensor. The magnetic field sensor 210 is preferred over the other sensors because it is less sensitive to most kinds of fouling and consumes less energy as compared to the other kind of sensors. Further, the magnetic field sensor 210 is set into periodic operation by the processor 202. The magnetic field sensor 210, in operation, provides measuring values to the central unit 102, where the measuring values are representative of the presence or absence of an object.

In one implementation, the sensing device 104 may include a radar sensor 212 for confirming the measurements of the magnetic field sensor 210. The working or operation of the radar sensor 212 is described below with reference to the description of FIG. 4 and FIG. 5.

In one implementation, the sensing device 104 may further include module(s) 214 and data 216. The modules 214 and the data 216 may be coupled to the processor(s) 202. The modules 214, amongst other things, include routines, programs, objects, components, data structures, etc., which perform particular tasks or implement particular abstract data types. The modules 214 may also be implemented as, signal processor(s), state machine(s), logic circuitries, and/or any other device or component that manipulate signals based on operational instructions. In another aspect of the present subject matter, the modules 214 may be computer-readable instructions which, when executed by a processor/processing unit, perform any of the described functionalities. The machine-readable instructions may be stored on an electronic memory device, hard disk, optical disk or other machine-readable storage medium or non-transitory medium. In one implementation, the computer-readable instructions can be also be downloaded to a storage medium via a network connection.

In one implementation, the module(s) 214 includes the detection module 108, a magnetic calibration module 216, a radar calibration module 218, and other module(s) 220. In an example, the detection module 108 may include the magnetic detection module 110 and the radar detection module 112. Further, the other module(s) 220 may include programs or coded instructions that supplement applications or functions performed by the sensing device 104.

The data 216 serves, amongst other things, as a repository for storing data processed, received and generated by one or more of the components of the detection module 108. The data 216 includes, for example, occupancy status data 222 and other data 224. In one implementation, although the data 216 is shown internal to the sensing device 104, it may be understood that the data 216 can reside in an external repository (not shown in the figure), which may be coupled to the sensing device 104. The sensing device 104 may communicate with the external repository through the I/O interface(s) 204 to obtain information from the data 216. In an example, the occupancy status data 222 is indicative of an 'occupied' occupancy status and an 'empty' occupancy status of a respective space in a space lot.

Figure 3:
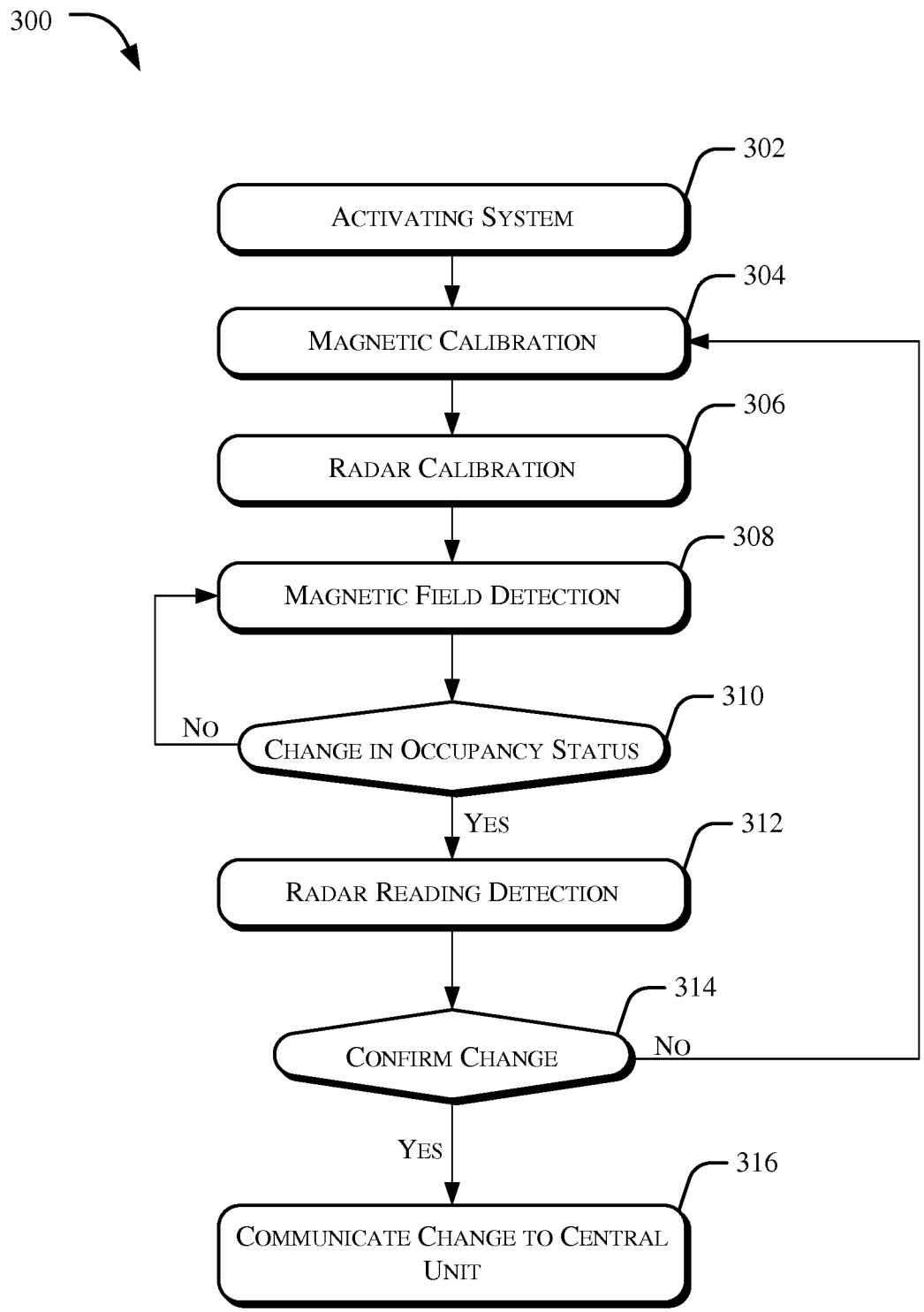
FIG. 3 illustrates a method for detection of the change in the occupancy status of the space, in accordance with the present subject matter.

The working or operation of the sensing device 104, illustrated in FIG. 2, is described in detail with reference to FIG. 3 in the description hereinafter. FIG. 3 illustrates exemplary method 300 for detecting an occupancy status of a respective space monitored by the system 100, in accordance with one implementation of the present subject matter. The exemplary method 300 is described in the general context of computer executable instructions. Generally, computer executable instructions can include routines, programs, objects, components, data structures, procedures, modules, functions, etc., that perform particular functions or implement particular data types.

Further, the order in which the method 300 is described is not intended to be construed as a limitation, and any number of the described method blocks can be combined in any order to implement the method, or an alternative method. Additionally, individual blocks may be deleted from the method without departing from the scope of the subject matter described herein.

At block 302, the system 100 having the central unit 102 and the sensing devices 104 is activated for detecting the occupancy status of the spaces in a space lot, such as parking lot. In general, when the system 100 is initially activated, it is generally presumed that all the spaces in the space lot have 'empty' occupancy status. Thus, the sensing devices 104 implemented in the respective spaces keep detecting a change in the occupancy status of the spaces at regular intervals, say, 1 Hertz.

At block 304, once the system 100 is activated, each of the sensing devices 104 is initially calibrated so that an error free detection can be performed by the sensing devices 102. For example, in the absence of an object in a space, a sensing device 104 initiates the functions by activating the magnetic calibration module 216. The magnetic calibration module 216 triggers the magnetic field sensor 210 to measure earth's magnetic field values, in the absence of the object in the space, for a predetermined number of times, during a predefined calibration time period. In an example, the earth's magnetic field value can be determined for one-direction or three-direction. Thereafter, based on an average of the earth's magnetic field values measured during the predefined calibration time period, the magnetic calibration module 216 determines a reference magnetic field value, i.e., earth's magnetic field value.

In general, a reference magnetic field value in an environment free of any metal or magnetic barrier is equal to the earth's magnetic field value. However, in a managed or closed environment, the reference magnetic field value may deviate significantly form the earth's magnetic field value over a period of time. It is therefore necessary to carry out periodic calibration of the magnetic field sensor 210. In an example, the periodic calibration of the magnetic field sensor 210 may be carried out once in a week.

At block 306, once the magnetic field sensor 210 is calibrated, the radar calibration module 218 is actuated to calibrate the radar sensor 212. The radar calibration module 218 then activates the radar sensor 212 to emit, from its transmitter, a signal and receive, at its receiver, a reflected signal from an external object. As can be appreciated by a person skilled in the art, the reflected signal is generally equal to zero or null in the absence of the external object. That is, when no external object is present, no reflected signal can be received at the receiver of the radar sensor 212.

However, in case when no external object is present and the radar sensor 212 receives the reflected signal, the radar sensor 212 is then required to be calibrated by the radar calibration module 218. As appreciated by the person skilled in the art that such case occurs when an internal reflection signal is being received by the receiver of the radar sensor 212. The internal reflection signal is mainly received due to the reflections of the signal from aging components constituting the radar sensor 212. In order to correct or cancel out the internal reflection signal, the radar calibration module 218 obtains a phase-shift attenuation value for the received internal reflection signal, and combines the phase-shift attenuation value with the received internal reflection signal. The process of correction, i.e., obtaining and combining the phase-shift attenuation value, is repeated until a minimum or no internal reflection signal is obtained at the receiver.

As can be appreciated by a person skilled in the art that, theoretically, the correction can be perfect; however, in practice, the correction is limited. Thus, a periodic calibration of the radar sensor 212 is required to be carried out. In an example, the periodic calibration of the radar sensor 212 may be carried out once in six months.

The order of the calibration, of the magnetic field sensor 210 and the radar sensor 212, described herein is not intended to be construed as a limitation, and thus the radar sensor calibration can be performed before the magnetic field sensor calibration, and vice versa.

Further, at block 308, once the calibration of the magnetic field sensor 210 and the radar sensor 212 are performed, the detection module 108 is activated to initiate the detection of an occupancy status of the space. Upon activation, the detection module 108 first calls the magnetic detection module 110 to activate the magnetic field sensor 210 for detecting a magnetic field value at the space, an occupancy status of which is to be detected. The magnetic field sensor 210 then detects a magnetic field value in the space, and provides the detected magnetic field value to the magnetic detection module 110. The magnetic detection module 110 then compares the detected magnetic field value with the reference magnetic field value, which is determined at the time of calibration. Based on the comparison, the magnetic detection module 110 determines a magnetic occupancy status (MOS) of the space. In an example, the MOS indicates the occupancy status of the object in the space. In this example, the occupancy status may be 'empty' or 'occupied' occupancy status.

At block 310, based on the MOS, the detection module 108 detects whether there is any change in the occupancy status of the space in relation to the previous occupancy status of the space. For example, the detection module 108 may detect that whether the occupancy status of the space has changed from 'empty' to 'occupied', and vice versa. In an example, in case the detection module 108 detects that there is no change in the occupancy status of the space, the detection module 108 may again trigger the magnetic detection module 110 to keep detecting the occupancy status of the space, until the detection module 108 may detect a change in the occupancy status of the space.

However, in an alternative example, in case the detection module 108 detects a change in the occupancy status of the space, the detection module 108 may then activate the radar detection module 112 to confirm the change in the occupancy status detected by the magnetic field sensor 210.

At block 312, the radar detection module 112 may activate the radar sensor 212 to confirm the change in the occupancy status detected by the magnetic field sensor 210. Upon activation, the radar sensor 212 generates at least one radar reading, based on which the radar detection module 112 determines a radar occupancy status (ROS). Further, as mentioned previously, the working and operation of the radar sensor 212 for determining the ROS is described below in conjunction with FIG. 4 and FIG. 5.

In an example, the ROS is indicative of the occupancy status of the space. In this example, the occupancy status may include 'empty' or 'occupied' occupancy status.

At block 314, once the ROS is determined, the detection module 108 determines whether the ROS indicating the change in the occupancy status of the space is in agreement with the MOS. That is, the detection module 108 may determine that whether both the ROS and the MOS indicates a change in the occupancy status of the space or not.

At block 316, when it is confirmed that ROS indicating the change in the occupancy status is in agreement with the MOS, the detection module 108 establishes or confirm that there is a change in the occupancy status of the space and deactivates the radar sensor 212. The detection module 108 then updates the occupancy status data 222 for the sensing device 104, and communicates the same to the central unit 102 of the system 100 described herein. In an example, the central unit 102 may be positioned within or outside the space, in which the sensing device 104 is placed at a ground floor.

However, in an example, the detection module 108 may determine the ROS to be in disagreement with the MOS. In such scenario, for a predetermined number of times, the detection module 108 may re-determine the MOS and the ROS, and compare the re-determined MOS and the ROS. Further, in the said example, in case the re-determined ROS and the MOS are found to be in agreement with each other during the predetermined number of times, the detection module 108 may establish the change in the occupancy status of the space and communicate the same to the central unit 102.

Yet further, in an alternative example, in case the disagreement lies between the ROS and the MOS even after the predetermined number of times, the detection module 108 may then establish that there is no change in the occupancy status of the space, and does not communicate anything to the central unit 102. That is, the detection module 108 or the sensing device 104 does not communicate with the central unit 102 when there is no change detected in the occupancy status of the space.

Further, in an example, when the disagreement lies between the ROS and the MOS even after the predetermined number of times, the magnetic field sensor 210 is desensitized and is recalibrated by the magnetic calibration module 216. During a time period in which the magnetic field sensor 210 is desensitized, the detection module 108 performs measurements solely through the radar sensor 212. For this, the radar sensor 212 may perform measurements at regular intervals, say, 1 second (1 Hertz).

In addition to that, in an example, as known from the state of the art, the magnetic field sensor 210 may, sometimes, fail to detect any change in the occupancy status of the space even when the change actually occurs. For such scenarios, the present subject matter provides that the radar sensor 212 would be periodically activated by the sensing device 104 to detect the change in the occupancy status. In an example, the radar sensor 212 may activate at regular intervals of, say, 10 seconds.

Thereafter, when the magnetic field sensor 210 is recalibrated, the detection module 108 may reactivate the magnetic field sensor 210 for performing measurements at the regular intervals and deactivate the radar sensor 212 thereafter.

In an example, as mentioned previously, the magnetic field sensor 210 and the radar sensor 212 are required to be calibrated at regular intervals. In such example, when one sensor in under calibration, the detection of the change in the occupancy state of a respective space is performed solely through the other sensor. For example, when the radar sensor 212 is under calibration, the detection of the change in the occupancy state is solely performed by the magnetic field sensor 210, and vice versa.

Figure 4:
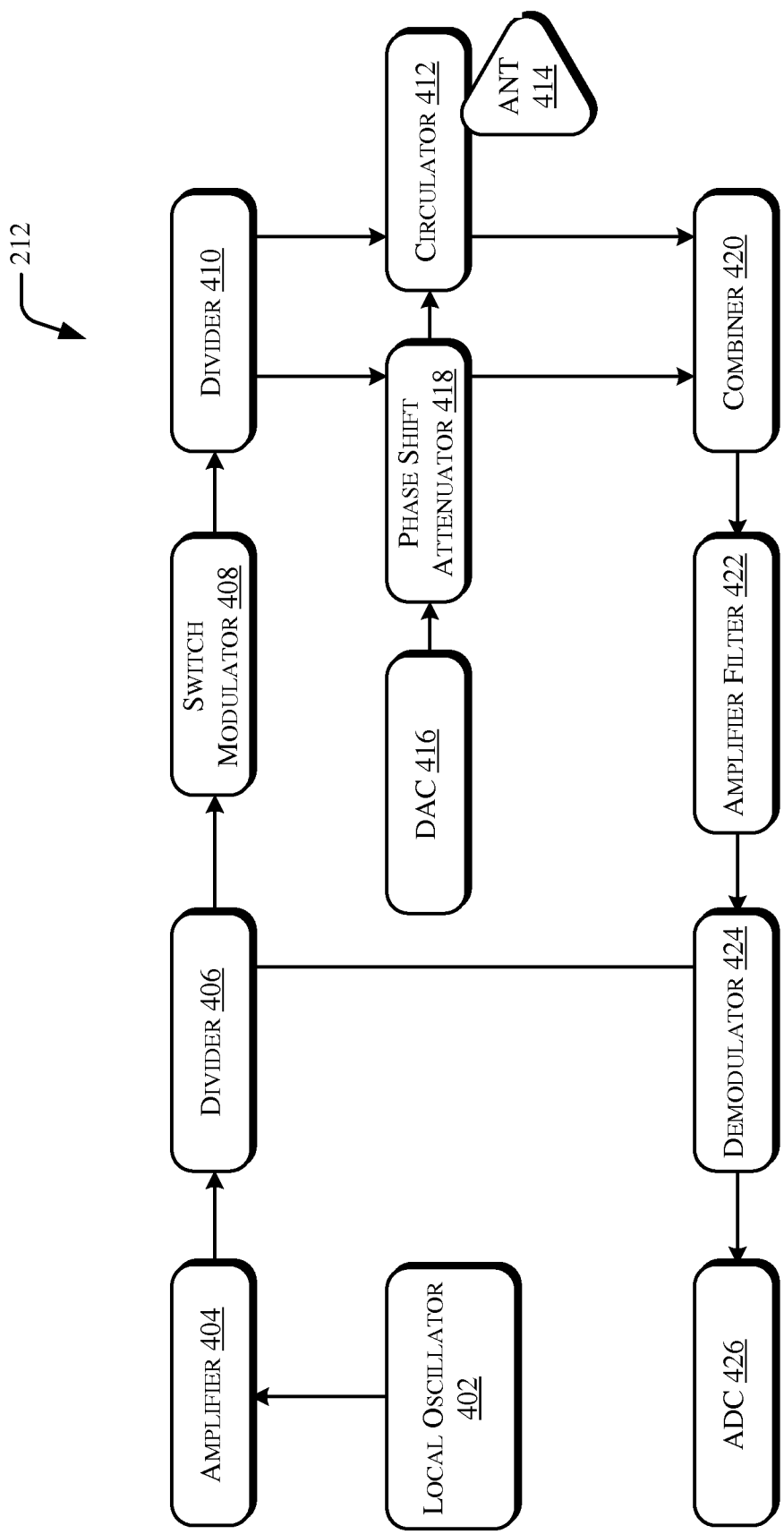
FIG. 4 illustrates an exemplary radar sensor for detection of the change in the occupancy status of the space, in accordance with the present subject matter.
Figure 5:
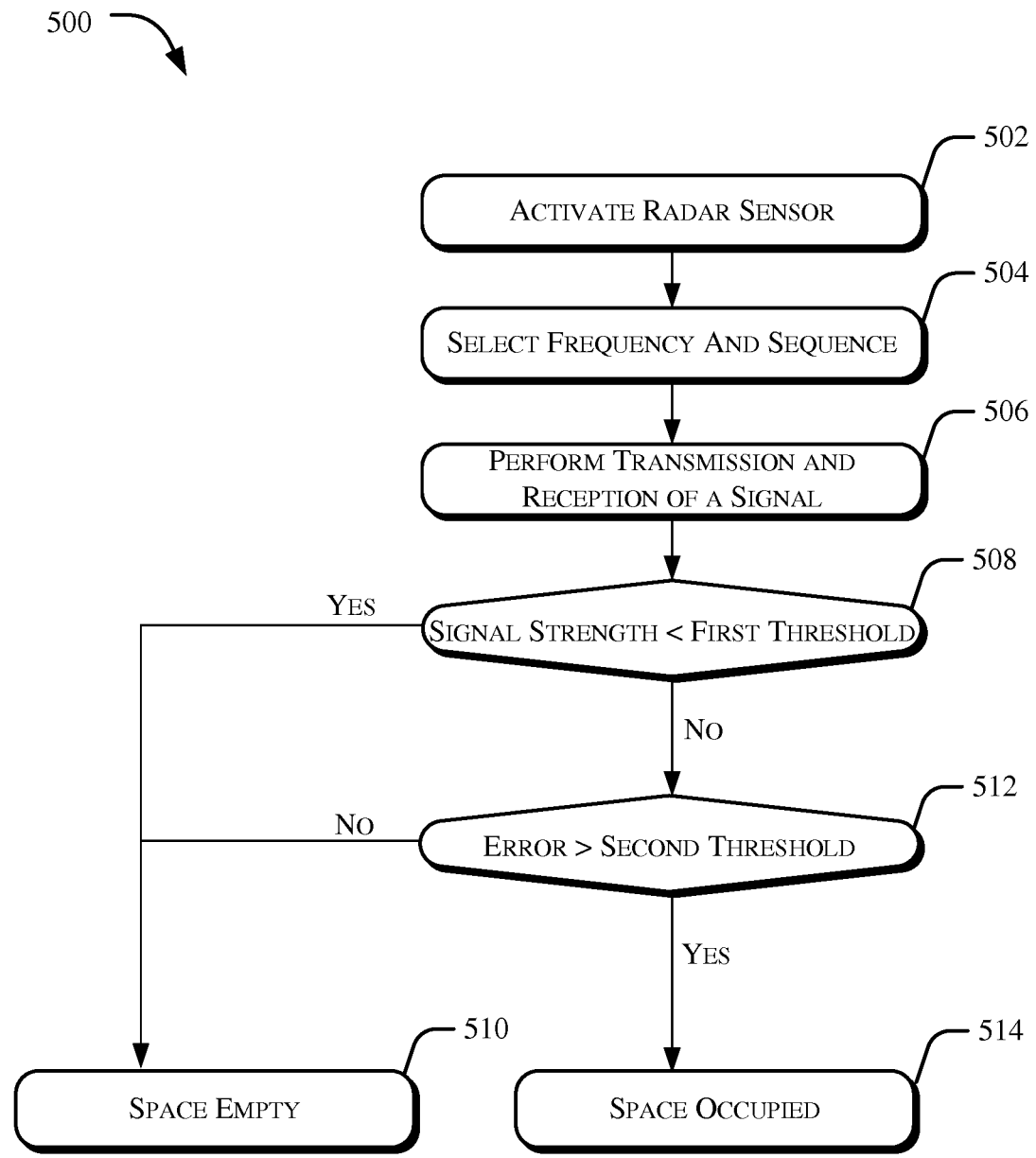
FIG. 5 illustrates a method for detection of the change in the occupancy status of the space using the radar sensor, in accordance with the present subject matter.

The working and operation of the radar sensor 212 is explained hereinafter in conjunction with FIG. 4 and FIG. 5. FIG. 4 illustrates exemplary components of the radar sensor 212, in accordance with an embodiment of the present subject matter. FIG. 5 illustrates exemplary method 500 for detecting a change in an occupancy status through the radar sensor 212, in accordance with one implementation of the present subject matter. The exemplary method 500 is described in the general context of computer executable instructions. Generally, computer executable instructions can include routines, programs, objects, components, data structures, procedures, modules, functions, etc., that perform particular functions or implement particular data types.

Further, the order in which the method 500 is described is not intended to be construed as a limitation, and any number of the described method blocks can be combined in any order to implement the method, or an alternative method. Additionally, individual blocks may be deleted from the method without departing from the scope of the subject matter described herein.

Referring to FIG. 4, the radar sensor 212 includes various components that facilitate the radar sensor 212 to perform three major functions, namely transmission, correction, and reception. Based on the three major functions, the various components of the radar sensor 212 can be categorized as transmission components, correction components, and reception components. For example, the transmission components may include a local oscillator 402, an amplifier 404, a divider 406, a switch modulator 408, a divider 410, a circulator 412, and an antenna 414. The correction components may include a digital-to-analog converter (DAC) 416 and a phase-shift attenuator 418. The reception components may include a combiner 420, an amplifier filter 422, a demodulator 424, and an analog-to-digital converter (ADC) 426.

In an example, the radar sensor 212 detects the change in the occupancy state of a respective space by transmitting a signal and measuring a fraction of the signal reflected from an object present in an area covered by the radar sensor 212. In an example, the purpose of the radar detection module 112 is to detect the presence of a metallic object at a distance of about 20 cm to 300 cm from the radar sensor 212.

Referring now to FIG. 5, at block 502, the radar sensor 212 is activated by the radar detection module 112 to detect the change in the occupancy status of the space, when the magnetic field sensor 210 detects the change in the occupancy status of the space. In other words, the radar sensor 212 is activated to confirm the detection performed by the magnetic field sensor 210.

At block 504, the radar detection module 112 selects a frequency and a pseudo random code sequence for transmission of a, mono-frequency, signal in the space covered by the radar sensor 212. In accordance with the present subject matter, the radar sensor 212 includes the local oscillator 402 to generate a signal with the frequency selected by the radar detection module 112. In an example, the local oscillator 402 may generate the signal with a frequency of about 2.4 GHz. The frequency of 2.4 GHz is selected by radar detection module 112 as the 2.4 GHz frequency is found to be compatible with local regulations of most of the countries.

Once the signal of 2.4 GHz frequency is generated by the local oscillator 402, the signal is amplified using an amplifier 404, for example, to achieve signal strength of 4 dbm. The amplification is performed in such a way that it is compatible with the local regulations. Further, in an example, the radar sensor 212 includes the divider 406 to control or maintain signal strength of the amplified signal within a range of +10 dbm to −5 dbm, to assure a proper operation of the radar sensor 212 within a defined framework and to reduce interference when multiple sensing devices operating in adjacent spaces. In an example, the defined framework may be referred to as a target of having 99.9% correct detections of the presence of metal objects at a distance of 20 cm to 300 cm from the radar sensor 212.

Thereafter, the switch modulator 408 of the radar sensor 212 modulates the radar signal with the pseudo random code sequence selected by the radar detector module 112. The radar signal is modulated using the pseudo random code sequence so that the receiving components of the radar sensor 212 may know that the reflected signal is really transmitted from the transmission components of the radar sensor 212 and not transmitted from the adjacent sensing device's radar sensor. Further, in an example, the pseudo random code sequence can be of about 100 bits. In other words, the transmission of such modulated signal with the pseudo random code sequence may last for about 1 ms, i.e., 100 bits transmitted at 100 Kbits/sec. A point to be noted here is that the longer the duration, the greater the consumption, but reliable detection because pseudo random code sequence is also longer.

In an example, the switch modulator 408 may be an on-off keying (OOK) modulator. In said example, the modulation of the signal is performed by opening and closing an electric switch. Further, such modulation is performed at a modulation frequency of about 100 kHz. In an alternative example, other modulators can also be selected without any restriction and limitation.

At block 506, the modulated signal is transmitted from the radar sensor 212 using the divider 410, the circulator 412, and the antenna 414. In an example, the antenna 414 is designed to radiate the modulated signal at the frequency of 2.4 GHz. Further, the antenna 414 can be omni-directional or bi-directional. As can be appreciated by a person skilled in the art, the use of bi-directional antenna can increase the power density in a direction of the object detection while reducing the consumption of energy and interference from adjacent sensing devices.

Further, in an alternative example, while transmitting the modulated signal, the modulated signal may undergo internal reflections within the radar sensor 212 because changes in the impedance of different parts of the radar sensor's circuit do not allow a perfect adaptation of the antenna 414. Typically, an internal reflection signal is several orders of magnitude higher than the magnitude of the reflected signal from an external object, and therefore can be identified easily. Further, a period of reflection of the internal reflection signal is almost nil or zero as compared to the period of reflection of the reflected signal from the external object positioned at a distance greater than 20 cm from the radar sensor 212. Further, a sum of the internal reflection signal is a signal of the same frequency as the transmitted modulated signal, but phase-shifted and attenuated. Hence, the internal reflection signal is proportional to the transmitted modulated signal.

In the mentioned alternative example, a correction is to be performed to cancel out or correct the internal reflection signal. For this, the digital-to-analog converter (DAC) 416 and the phase-shift attenuator 418 of the radar sensor 212. In an example, the phase-shift attenuator 418 may be a modulator in which a signal input, i.e., a mono-frequency signal, is phase-shifted and attenuated. The phase-shifted and attenuated signal is then injected, in the circulator 412, so that the internal reflection signal is cancelled out and the reflected signal received by the reception components of the radar sensor 212 is constituted mainly by the external reflections.

Further, upon receipt of the reflected signal from the external object, the reflected signal is combined with the phase-shifted signal in the combiner 420, to remove the internal reflection signal. In other words, the reflected signal is filtered in the combiner 420 and passed to the amplifier filter 422.

At block 508, the amplifier filter 422 may determine signal strength of the reflected signal and provide the same to the radar detection module 112. The radar detection module 112 then compares the determined signal strength with a first threshold to detect a change in the occupancy status of the space from which the reflected signal is received. In an example, in case the signal strength of the reflected signal is determined below the first threshold by the radar detection module 112, then the reflected signal is considered as noise and the space is considered as absent from object. That is, when the signal strength of the reflected signal is determined below the first threshold, an 'empty' occupancy status is detected for the space by the radar detection module 112.

However, in an alternative example, in case the radar detection module 112 determines the signal strength of the reflected signal above the first threshold, then the reflected signal is provided by the radar detection module 112 to the demodulator 424. In an example, the demodulator 424 can be a switch demodulator that demodulates the reflected signal to obtain a binary or bit sequence of same length as that of the transmitted modulated signal. The bit sequence is then provided to the radar detection module 112 though the analog-to-digital converter 426 for further processing.

In an example, based on the received bit sequence, the radar detection module 112 calculates a mean square error between transmitted bit sequence and received bit sequence. The calculated mean square error is then compared to a second threshold. In case, the mean square error is determined below the second threshold, the radar detection module 112 establishes that an object is detected and establishes an 'occupied' occupancy status of the space. Otherwise, the measurement by the radar sensor 212 is carried out for a predefined number of times, and will stop when an object is detected or not detected at the end of the measurements performed for the predefined number of times.

Although implementations for methods and systems for detection of an occupancy status are described, it is to be understood that the present subject matter is not necessarily limited to the specific features or methods described. Rather, the specific features and methods are disclosed as implementations for space management systems.

I claim:
1. A method for detection of an occupancy status of a space monitored by a system, the method comprising:
    detecting a magnetic field value at the space by a magnetic field sensor of a sensing device;
    determining, using a radar detection module of the sensing device, a radar occupancy status (ROS) at the space, wherein the radar detection module takes measurements at a first periodic frequency;
    comparing the detected magnetic field value with a reference magnetic field value using a magnetic field detection module of the sensing device, the magnetic field detection module being coupled to a processor of the sensing device;
    determining, using the magnetic field detection module, a magnetic occupancy status (MOS) of the space based on the comparison, wherein the MOS is indicative of the change in the occupancy status of the space;
    comparing the MOS with the ROS;
    establishing the change in the occupancy status of the space when the ROS indicates the change in the occupancy status of the space and the ROS is in agreement with the MOS;
    communicating the change of the occupancy status in the space to a central unit of the system;
    when the MOS is in disagreement with the ROS, re-determining the MOS by the magnetic field detection module and re-determining the ROS by the radar detection module for a pre-determined number of times;

when the MOS is in disagreement with the ROS after the pre-determined number of times, desensitizing the magnetic field sensor and recalibrating the magnetic field sensor; and after determining that the magnetic field sensor is being recalibrated, configuring the radar detection module to take measurements at a second periodic frequency, wherein the second periodic frequency comprises a higher frequency than the first periodic frequency.

2. The method as claimed in claim 1, wherein the detecting of the magnetic field value at the space by the magnetic field sensor is carried out at a frequency of 1 hertz.

3. The method as claimed in claim 1, wherein the detecting of the magnetic field value at the space and the determining of the ROS are carried out at 250 µA/3 V.

4. The method as claimed in claim 1, wherein the sensing device comprises a radar sensor, and wherein the determining of the ROS comprises:
   modulating a signal with a pseudo random code sequence using a switch modulator of the radar sensor;
   transmitting the modulated signal towards the space from a transmitter of the radar sensor;
   receiving a reflected signal from the space at the radar sensor at a receiver of the radar sensor; and
   demodulating the reflected signal to obtain a bit sequence of same length as that of the transmitted modulated signal.

5. The method as claimed in claim 1 further comprises operating the radar detection module at a frequency of 2.4 Giga Hertz (GHz).

6. The method as claimed in claim 1, wherein the method further comprises:
   establishing no change in the occupancy status of the space based on the comparison, when the MOS is in disagreement with the ROS after the pre-determined number of times.

7. The method as claimed in claim 1, wherein the method further comprises reactivating the magnetic field sensor after recalibrating the magnetic field sensor and configuring the radar detection module to take measurements at the first periodic frequency.

8. A system for detection of a change in occupancy status of a space comprising:
   a central unit monitoring the change in the occupancy status of the space; and
   a sensing device communicatively coupled to the central unit, wherein the sensing device comprises:
   a processor;
   a magnetic detection module, coupled to the processor, to:
      compare a detected magnetic field value at the space by a magnetic field sensor with a reference magnetic field value of the space, and
      determine a magnetic occupancy status (MOS) of the space based on the comparison, wherein the MOS is indicative of the change in the occupancy status of the space, and wherein the change in the occupancy status is indicative of one of:
         a change from empty to occupied occupancy status, and
         a change from occupied to empty occupancy status; and
   a radar detection module, coupled to the processor, to:
      determine a radar occupancy status (ROS) by performing periodic radar readings at a first periodic frequency, wherein the ROS is indicative of change in the occupancy status of the space;
      compare the MOS with the ROS;
      establish the change in the occupancy status of the space when the MOS is in agreement with the ROS;
      establish no change in the occupancy status of the space when the MOS is in disagreement with the ROS;
      communicate the change in the occupancy status of the space to the central unit;
      when the MOS is in disagreement with the ROS, re-determine the MOS by the magnetic detection module and re-determine the ROS by the radar detection module for a pre-determined number of times;
      when the MOS is in disagreement with the ROS after the pre-determined number of times, desensitize the magnetic field sensor and recalibrate the magnetic field sensor; and
      after determining that the magnetic field sensor is being recalibrated, perform the radar readings at a second periodic frequency, wherein performing the radar readings at the second periodic frequency comprises performing the radar readings more frequently than at the first periodic frequency.

9. The system as claimed in claim 8, wherein the radar detection module comprises a radar sensor, and wherein the radar sensor performs determination of ROS by:
   modulating a signal with a pseudo random code sequence using a switch modulator of the radar sensor;
   transmitting the modulated signal towards the space from a transmitter of the radar sensor;
   receiving a reflected signal from the space at the radar sensor at a receiver of the radar sensor; and
   demodulating the reflected signal to obtain a bit sequence of same length as that of the transmitted modulated signal.

10. The system as claimed in claim 8, wherein the radar detection module is operated at a frequency of 2.4 Giga Hertz (GHz).

11. The method as claimed in claim 1, wherein taking measurements at the first periodic frequency comprises taking a measurement once every ten seconds, and wherein taking measurements at the second periodic frequency comprises taking a measurement once every second.

12. One or more non-transitory computer-readable media storing executable instructions that, when executed by a computing device comprising at least one processor, cause the computing device to:
   detect, via a magnetic field sensor, a magnetic field value corresponding to a parking space;
   configure a radar sensor to take radar measurements, corresponding to the parking space, at a first periodic frequency;
   determine, by comparing the detected magnetic field value with a reference magnetic field value, a magnetic occupancy status (MOS) of the parking space, wherein the MOS is indicative of whether the parking space is occupied;
   determine, based on the radar measurements, a radar occupancy status (ROS) of the parking space;
   compare the MOS with the ROS;
   when the MOS is in disagreement with the ROS, re-determine the MOS by the magnetic field sensor and re-determine the ROS by the radar sensor for a pre-determined number of times;

when the MOS is in disagreement with the ROS after the pre-determined number of times, desensitize the magnetic field sensor and recalibrate the magnetic field sensor;

after determining that the ROS indicates a change in the occupancy status of the space and the ROS is in agreement with the MOS, store an indication of a change in occupancy status of the parking space;

after determining that the magnetic field sensor is being recalibrated, configure the radar sensor to take radar measurements at a second periodic frequency, wherein the second periodic frequency comprises a higher frequency than the first periodic frequency; and after determining that the magnetic field sensor has returned to normal operation, configure the radar sensor to take radar measurements at the first periodic frequency.

* * * * *